US010595071B2

(12) United States Patent
Wang

(10) Patent No.: US 10,595,071 B2
(45) Date of Patent: Mar. 17, 2020

(54) MEDIA INFORMATION DELIVERY METHOD AND SYSTEM, TERMINAL, SERVER, AND STORAGE MEDIUM

(71) Applicant: TENCENT TECHNOLOGY (SHENZHEN) COMPANY LIMITED, Shenzhen, Guangdong (CN)

(72) Inventor: Xing Xing Wang, Shenzhen (CN)

(73) Assignee: TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 0 days.

(21) Appl. No.: 16/009,426

(22) Filed: Jun. 15, 2018

(65) Prior Publication Data

US 2018/0310043 A1    Oct. 25, 2018

Related U.S. Application Data

(63) Continuation of application No. PCT/CN2017/096175, filed on Aug. 7, 2017.

(30) Foreign Application Priority Data

Aug. 8, 2016    (CN) .......................... 2016 1 0643369

(51) Int. Cl.
*H04N 21/2668*    (2011.01)
*H04N 21/44*    (2011.01)
(Continued)

(52) U.S. Cl.
CPC ... *H04N 21/2668* (2013.01); *H04N 21/23418* (2013.01); *H04N 21/44008* (2013.01);
(Continued)

(58) Field of Classification Search
CPC ......... H04N 21/2668; H04N 21/44222; H04N 21/44008; H04N 21/4722; H04N 21/47217; H04N 21/812; H04N 21/23418
(Continued)

(56) References Cited

U.S. PATENT DOCUMENTS

2004/0116183 A1    6/2004    Prindle
2005/0229227 A1*   10/2005   Rogers ................... G06Q 30/02
                                                          725/115
(Continued)

FOREIGN PATENT DOCUMENTS

CN    101072340 A    11/2007
CN    101699863 A     4/2010
(Continued)

OTHER PUBLICATIONS

International Search Report of PCT/CN2017/096175 filed Oct. 27, 2017.
(Continued)

*Primary Examiner* — Cynthia M Fogg
(74) *Attorney, Agent, or Firm* — Sughrue Mion, PLLC

(57) ABSTRACT

A media information delivery method includes providing a playing interface and playing a video on the playing interface; in response to the video being played to a video point location, tracking display of a target object included in at least one frame image of the video point location by using a tracking identifier corresponding to the target object in the playing interface, and providing an interactive element corresponding to the target object on the playing interface; and providing, in response to an operation regarding the interactive element, a result responding to the operation in the playing interface, and providing media information corresponding to the target object on the playing interface.

16 Claims, 12 Drawing Sheets

(51) Int. Cl.
*H04N 21/81* (2011.01)
*H04N 21/4722* (2011.01)
*H04N 21/472* (2011.01)
*H04N 21/442* (2011.01)
*H04N 21/234* (2011.01)

(52) U.S. Cl.
CPC ... *H04N 21/44222* (2013.01); *H04N 21/4722* (2013.01); *H04N 21/47217* (2013.01); *H04N 21/812* (2013.01)

(58) Field of Classification Search
USPC .......................................................... 725/34
See application file for complete search history.

(56) References Cited

U.S. PATENT DOCUMENTS

| | | | | |
|---|---|---|---|---|
| 2014/0223474 A1* | 8/2014 | Wang | ................. | H04N 21/4415 725/34 |
| 2014/0259056 A1* | 9/2014 | Grusd | ................. | H04N 21/8583 725/34 |
| 2014/0363143 A1* | 12/2014 | Dharssi | .............. | G06K 9/00765 386/282 |
| 2015/0215605 A1 | 7/2015 | Stephan | | |
| 2015/0256858 A1 | 9/2015 | Xue | | |
| 2017/0103264 A1* | 4/2017 | Javan Roshtkhari | ........................ | G06K 9/00718 |
| 2017/0255832 A1* | 9/2017 | Jones | ................. | G06K 9/00718 |

FOREIGN PATENT DOCUMENTS

| | | |
|---|---|---|
| CN | 101753913 A | 6/2010 |
| CN | 103297840 A | 9/2013 |
| CN | 103888785 A | 6/2014 |
| CN | 104486680 A | 4/2015 |
| CN | 106210808 A | 12/2016 |

OTHER PUBLICATIONS

Communication dated Oct. 22, 2018, from the State Intellectual Property Office of People's Republic of China in counterpart Application No. 201610643369.3.

Communication dated Jul. 11, 2018, from the State Intellectual Property Office of People's Republic of China in counterpart Application No. 201610643369.3.

* cited by examiner

MEDIA INFORMATION DELIVERY METHOD AND SYSTEM, TERMINAL, SERVER, AND STORAGE MEDIUM

CROSS-REFERENCE TO RELATED APPLICATIONS

This application is a continuation of International Application No. PCT/CN2017/096175, filed on Aug. 7, 2017, in the Chinese Patent Office, which claims priority to Chinese Patent Application No. 201610643369.3, filed on Aug. 8, 2016, in the Chinese Patent Office, the disclosures of which are incorporated by reference in their entireties.

FIELD

The disclosure relates to an Internet technology in the field of communications, and more particularly relates to a media information delivery method and system, a terminal, a server, and a storage medium.

BACKGROUND

Internet video information is increasingly rich, users often watch video programs on various terminals (laptops, tablet computers, smart phones, etc.). There is a need to deliver media information (advertisements, multimedia pages, news, etc.) to terminal users when the users are watching the video programs.

Related technologies usually refer to: delivering media information to a user before the user watches a video and when the user is watching the video, and this manner of delivering media information has, at least, the following problems.

That is, it is difficult to ensure that the delivered media information is what the user currently needs is interested in, thereby resulting in an inability to meet delivery accuracy requirements for media information. Take advertising as an example, an advertisement arbitrarily delivered in a process of watching, by a user, a video not only is difficult to meet requirements of the user for acquiring media information, but also affects the delivery accuracy of the media information and causes interference to the user as well.

SUMMARY

One or more exemplary embodiments provide a media information delivery method and system, a terminal, a server, and a storage medium, capable of accurately delivering media information to a user, so as to avoid interference to the user caused by low delivery accuracy.

The technical solutions of the embodiment are implemented as follows.

According to an aspect of an exemplary embodiment, there is provided a media information delivery method, including: providing, by a terminal, a playing interface and playing a video on the playing interface; in response to the video being played to a video point location, tracking, by the terminal, display of a target object included in at least one frame image of the video point location by using a tracking identifier corresponding to the target object in the playing interface, and providing an interactive element corresponding to the target object on the playing interface; and providing, by the terminal, in response to an operation regarding the interactive element, a result responding to the operation in the playing interface, and providing media information corresponding to the target object on the playing interface.

According to another aspect of an exemplary embodiment, there is provided a media information delivery method, including: identifying, by a server, a target object of each frame image in a video; forming, by the server, point location data corresponding to different video point locations in the video based on the identified target object and an interactive element of the target object; and sending, by the server, the point location data to a terminal, the point location data being used for allowing the terminal to track display of the target object included in the video point location in a playing interface by using a tracking identifier corresponding to the target object in the playing interface, and to provide the interactive element corresponding to the target object on the playing interface.

According to still another aspect of an exemplary embodiment, there is provided a media information delivery method, including: identifying, by a server, a target object of each frame image in a video; forming, by the server, point location data corresponding to different video point locations in the video based on the identified target object and an interactive element of the target object; sending, by the server, the point location data to a terminal; providing a playing interface and playing the video on the playing interface; in response to the video being played to a video point location, tracking display of the target object included in at least one frame image of the video point location by using a tracking identifier corresponding to the target object in the playing interface, and providing the interactive element corresponding to the target object on the playing interface; and providing, in response to an operation regarding the interactive element, a result responding to the operation in the playing interface, and providing media information corresponding to the target object on the playing interface.

According to still another aspect of an exemplary embodiment, there is provided a terminal, including: at least one memory operable to store program code; and at least one processor operable to read the program code, and operate as instructed by the program code, said program code including: playing code configured to cause the at least one processor to provide a playing interface and play a video on the playing interface; loading code configured to cause the at least one processor to, in response to the video being played to a video point location, track display of a target object included in at least one frame image of the video point location by using a tracking identifier corresponding to the target object in the playing interface, and providing an interactive element corresponding to the target object on the playing interface; and response code configured to cause the at least one processor to, in response to an operation regarding the interactive element, provide a result responding to the operation in the playing interface, and provide media information corresponding to the target object on the playing interface.

According to still another aspect of an exemplary embodiment, there is provided a server, including: at least one memory operable to store program code; and at least one processor operable to read the program code, and operate as instructed by the program code, said program code including: identification code configured to cause the at least one processor to identify a target object of each frame image in a video; point location code configured to cause the at least one processor to form point location data corresponding to different video point locations in the video based on the identified target object and an interactive element of the target object; and sending code configured to cause the at least one processor to send the point location data to a terminal, the point location data being used for allowing the terminal to track display of the target object included in the video point location in a playing interface by using a tracking identifier corresponding to the target object in the playing interface, and to provide the interactive element corresponding to the target object on the playing interface.

According to still another aspect of an exemplary embodiment, there is provided a media information delivery system, including a server and a terminal, the server being configured to identify a target object of each frame image in a video, the server being further configured to form point location data corresponding to different video point locations in the video based on the identified target object and an interactive element of the target object, the server being further configured to send the point location data to the terminal, the terminal being configured to: provide a playing interface and play the video on the playing interface, in response to the video being played to a video point location, track display of the target object included in at least one frame image of the video point location by using a tracking identifier corresponding to the target object in the playing interface, and provide the interactive element corresponding to the target object on the playing interface; and in response to an operation regarding the interactive element, provide a result responding to the operation in the playing interface, and provide media information corresponding to the target object on the playing interface.

According to still another aspect of an exemplary embodiment, there is provided a non-transitory storage medium, storing an executable program, which, when executed by one or more processors, causes the one or more processors to perform: providing a playing interface and playing a video on the playing interface; in response to the video being played to a video point location, tracking display of a target object included in at least one frame image of the video point location by using a tracking identifier corresponding to the target object in the playing interface, and providing an interactive element corresponding to the target object on the playing interface; and providing, in response to an operation regarding the interactive element, a result responding to the operation in the playing interface, and providing media information corresponding to the target object on the playing interface.

According to still another aspect of an exemplary embodiment, there is provided a non-transitory storage medium, storing an executable program, which, when executed by one or more processors, causes the one or more processors to perform: identifying a target object of each frame image in a video; forming point location data corresponding to different video point locations in the video based on the identified target object and an interactive element of the target object; and sending the point location data to a terminal, the point location data being used for allowing the terminal to track display of the target object included in the video point location in a playing interface by using a tracking identifier corresponding to the target object in the playing interface, and to provide the interactive element corresponding to the target object on the playing interface.

The embodiment of the present invention has the beneficial effects as follows.

Delivery of media information is associated with the participation of a user in an interaction with a target object in a video. When the user participates in the interaction, media information such as an advertisement corresponding to the target object is delivered to the user, thereby avoiding the blindness of delivering media information in a video playing process in the related technology, and ensuring that the delivered media information meets current requirements of the user.

BRIEF DESCRIPTION OF THE DRAWINGS

These and/or other aspects of the disclosure will become apparent and more readily appreciated from the following description of the exemplary embodiments, taken in conjunction with the accompanying drawings.

DETAILED DESCRIPTION

Figure 1:
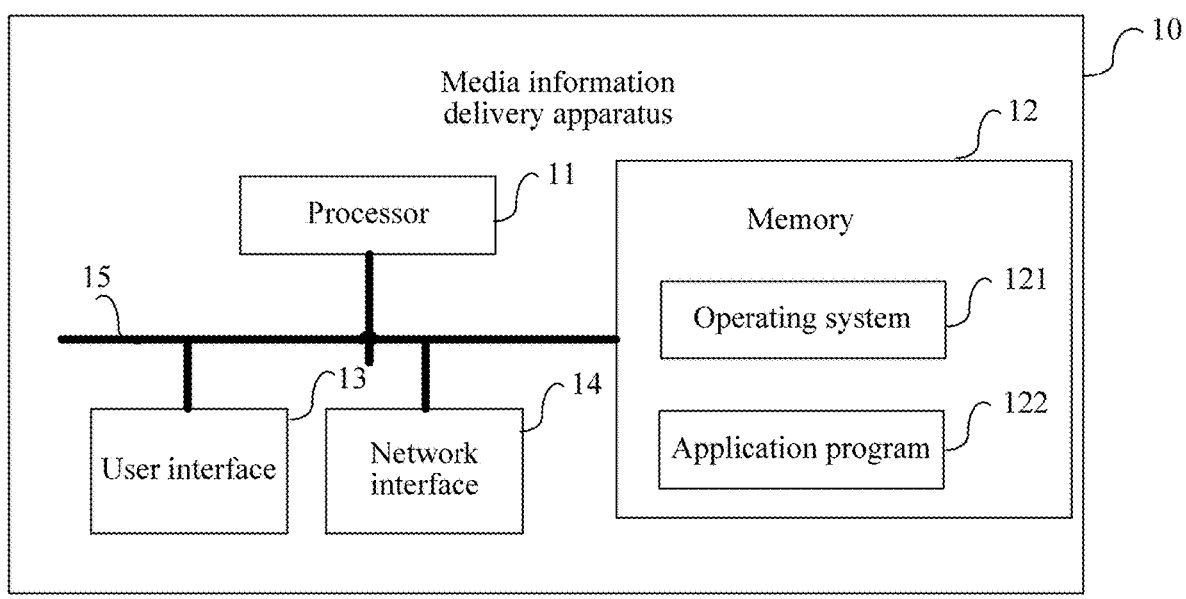
FIG. 1 is an optional schematic hardware structure diagram of a media information delivery apparatus located on a terminal side or a server side in an exemplary embodiment.

The following further describes the disclosure in detail with reference to the accompanying drawings and embodiments. It should be understood that exemplary embodiments provided herein are only used to explain the disclosure and are not used to limit the disclosure. In addition, the following embodiments are provided as some embodiments for implementing the disclosure, rather than all embodiments for implementing the disclosure. Embodiments obtained by reorganizing the technical solutions of the following embodiments by those skilled in the art without making creative work and other embodiments implemented based on the disclosure fall within the scope of protection of the disclosure.

It should be noted that terms "comprising", "including" or any other variants thereof are intended to cover non-exclusive inclusions in an exemplary embodiment, such that a method or apparatus comprising a series of elements not only comprises elements that are explicitly stated, but also comprises other elements that are not explicitly listed, or further comprises elements inherent to the implemented method or apparatus. Unless otherwise specified, an element limited by "comprising a/an . . . " does not exclude other same elements existing in a method or apparatus comprising the element.

It should also be noted that a term "first\second" involved in an exemplary embodiment merely distinguishes similar objects and does not represent a specific order of the objects. Understandably, the specific order or sequence of "first\second" may be interchanged with permission. It should be understood that the objects distinguished by "first\second" may be interchanged where appropriate so that exemplary embodiments described here can be implemented in an order other than those illustrated or described here.

The nouns and terms involved in exemplary embodiments are applicable to the following explanations.

1) Media information, any form of information that can be delivered to a terminal side, wherein in terms of type, the media information may be in a form of text, picture (e.g., dynamic picture, static picture, etc.), video and audio, etc.; and in terms of function, the media information may be an advertisement, a rich media page, etc.

2) Video point location: a segment formed by a time point or a plurality of time points (which may be continuous or intermittent) in a video, the video point location comprising at least one frame image, and when the video point location is a video segment, the video point location comprising a plurality of frame images.

3) Object: people, objects, animals, buildings, etc., included in each frame image in a video.

4) Target object: an object tracked and highlighted in a frame image of a video point location, wherein the target object may be one object in a frame image, or may include at least two objects in each frame image.

5) Point location data, corresponding to a video point location, wherein the point location data may comprise the following information:

5.1) location for describing a target object in each frame image of a video point location, that is, location of a target object in a corresponding frame image;

5.2) interactive element corresponding to a target object, or a manner of acquiring an interactive element, such as an address and an identifier for acquiring the interactive element; and 5.3) control over an interactive element, also referred to as an interactive form.

6) Interactive element: virtual items (virtual flowers, costumes, etc.), voice, animation, text (comments) or other elements, wherein the interactive element can produce an interaction effect with a user in a given interactive form, for example, a specific effect is generated according to an interactive element and an operation mode of user operations, such as, a display effect is changed, a specific voice prompt is given, an animation effect is generated, and a prompt text is provided.

7) Interactive form, used to control a loading order of interactive elements, a loading mode of interactive elements, and a combination mode of interactive elements.

8) Advertiser: a party who has advertising needs and pays corresponding fee for advertising, wherein the advertiser wants each paid advertisement click to be a valid click from a real user rather than a cheating click.

9) Advertising click: a user visits an advertiser's homepage by clicking on an advertisement on a user-side device (a smart phone, a tablet computer, or other terminal devices), wherein a user's click on an advertisement to visit an advertiser's homepage is referred to as an advertisement click.

10) Conversion rate: a ratio of the number of actual advertising effects (a user clicks on an advertisement, and registers an account on an advertiser's homepage, and downloads an APP, etc.) generated in exposed (one display of advertisement on a terminal is referred to as one exposure) advertisements to the number of the exposed advertisements.

11) Click rate: a ratio of advertisement clicks to an advertisement exposure count.

One or more exemplary embodiments provide a media information delivery method, a terminal, server and system using the media information delivery method.

The terminal provided in an exemplary embodiment may be implemented in various forms, and may, illustratively, be a mobile terminal such as a smart phone, a tablet computer and a vehicle terminal, or a fixed terminal in a form of a desktop computer, a smart TV and a set-top box, or a similar computing apparatus.

FIG. 1 illustratively shows an optional schematic hardware structure diagram of a media information delivery apparatus 10 located on a terminal side or a server side. The hardware structure shown in FIG. 1 is only illustrative, and does not form limitations to a device structure. For example, more components than those shown in FIG. 1 may be provided according to implementation, or partial components may be omitted according to implementation.

In FIG. 1, an optional hardware structure of the media information delivery apparatus 10 comprises at least one processor 11, a memory 12, at least one network interface 14, and a user interface 13. Various components in the media information delivery apparatus 10 are coupled together via a bus system 15. It will be understood that the bus system 15 is used to implement connection communications between these components. The bus system 15 also comprises, in addition to a data bus, a power bus, a control bus, and a status signal bus. However, for clarity of description, various buses are marked as the bus system 15 in FIG. 1.

The user interface 13 may comprise a display, a keyboard, a mouse, a trackball, a click wheel, a key, a button, a touch pad, a touch screen, or the like.

The network interface 14 provides the processor 11 with access to external data such as a remotely located memory 12. Illustratively, the network interface 14 may perform near-field communication based on a near field communication (NFC) technology, a Bluetooth technology and a ZigBee technology. In addition, communications based on communication systems such as code division multiple access (CDMA) and wideband code division multiple access (WCDMA) and evolution systems thereof may also be implemented.

It will be understood that the memory 12 may be either a volatile memory or a nonvolatile memory, and may also comprise both volatile and nonvolatile memories. The nonvolatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disc, or a compact disc read-only memory (CD-ROM), wherein the magnetic surface memory may be a disk memory or a tape memory. The volatile memory may be a random access memory (RAM) which is used as an external cache. By means of illustrative, but not restrictive, descriptions, many forms of RAMs are available, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a SyncLink dynamic random access memory (SLDRAM), and a direct rambus random access memory (DRRAM). The memory 12 described in an exemplary embodiment is intended to comprise, but is not limited to, these and any other suitable types of memories.

The memory 12 in an exemplary embodiment is used to store various types of data to support the operation of the media information delivery apparatus 10. Examples of these data comprise: any computer program for operating on the media information delivery apparatus 10, such as an operating system 121 and an application program 122; contact data; phone book data; messages; pictures; video. The operating system 121 includes various system programs, such as a framework layer, a core library layer and a driver layer, for implementing various basic services and processing hardware-based tasks. The application program 122 may include various application programs such as a media player and a browser, for implementing various application services. The program for implementing the method of the embodiment may be included in the application program 122.

The method disclosed in the foregoing embodiment may be applied to the processor 11 or implemented by the processor 11. The processor 11 may be an integrated circuit chip with signal processing capabilities. In an implementation process, each operation of the above method may be completed by an integrated logic circuit of hardware in the processor 11 and/or an instruction in a form of software. The processor 11 described above may be a general purpose processor, a digital signal processor (DSP), or other programmable logic devices, a discrete gate or transistor logic device, a discrete hardware component, or the like. The processor 11 may implement or execute each of the disclosed methods, operations, and logic block diagrams in an exemplary embodiment. The general purpose processor may be a microprocessor, any conventional processor or the like. The operations of the method disclosed in the embodiment may be directly implemented by a hardware decoding processor, or may be implemented by a combination of hardware and software modules in a decoding processor. The software module may be located in a storage medium, which is located in the memory 12, and the processor 11 reads information in the memory 12, and combines hardware to complete the operations of the foregoing method.

In an exemplary embodiment, the media information delivery apparatus 10 may be implemented by one or more application specific integrated circuits (ASICs), DSPs, programmable logic devices (PLDs), complex programmable logic devices (CPLDs), field-programmable gate arrays (FPGAs), general purpose processors, controllers, micro controller units (MCUs), microprocessors, or other electronic components, for executing the foregoing method.

The following makes illustrations with application of the media information delivery method and system, the terminal and the server provided by the embodiment to advertising. Those skilled in the art may easily implement the delivery of other types of media information based on the following description.

Figure 2:
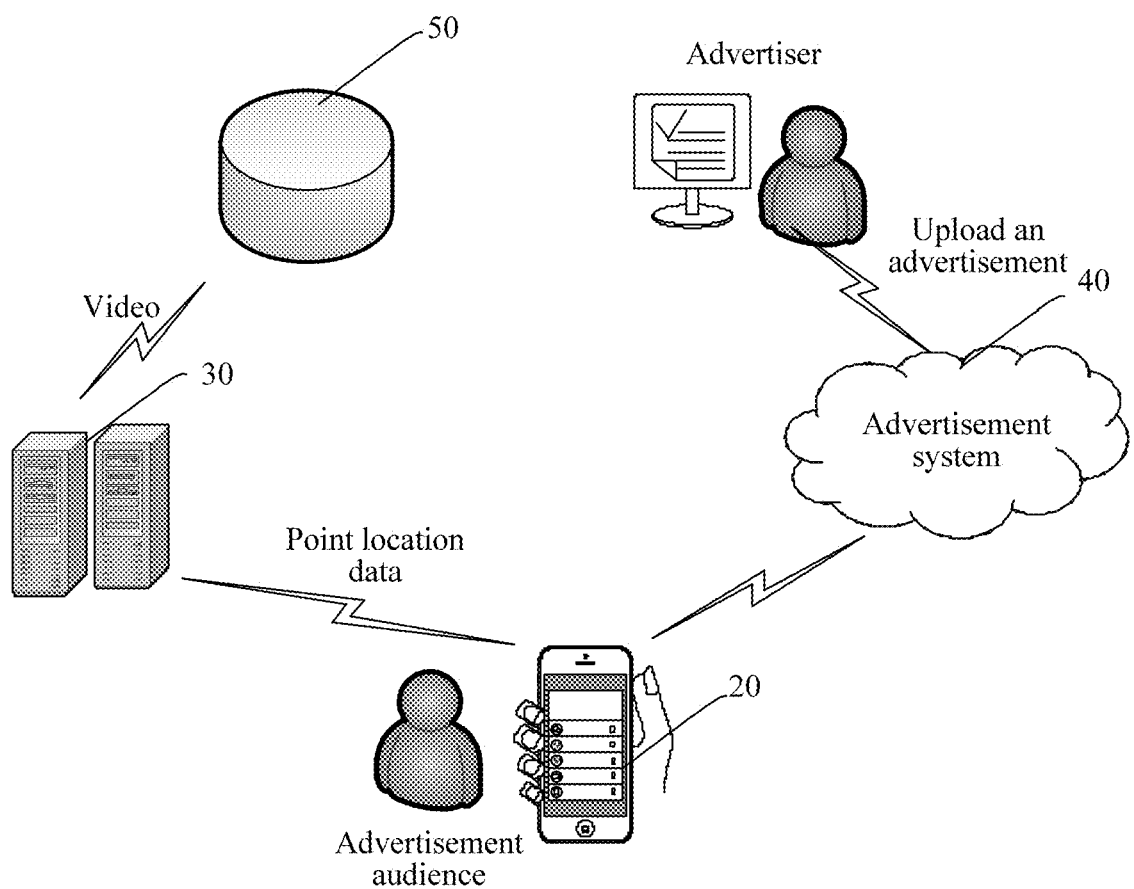
FIG. 2 is an optional schematic application scenario diagram of advertising in an exemplary embodiment.

An optional schematic application scenario diagram of advertising is as shown in FIG. 2. An advertiser selects a video to which an advertisement is delivered, such as a popular TV show and an entertainment program. Interactive elements such as virtual items and text comments that may be presented to the video via the operation are set for a target object (such as a target character) in a specific video point location (such as the climax of a story and presence fragments of main characters) in the video. An operation result may be displayed in a terminal 20 playing the video by a server 30 synchronously. Hereinafter, the term "character" may be used to refer to, for example but not limited to, a character image representing a certain user.

The server 30 forms point location data of different video point locations according to interactive elements, interactive forms and the like set by an advertiser, and when the terminal 20 plays a video in a database 50 to a video point location, interactive elements are loaded in a video playing interface of the terminal 20 according to the point location data issued by the server 30 to support an interactive operation on a target object appearing at a current video point location, such as giving flowers and other virtual items. Once a user participates in the interactive operation, it represents the user's attention to the target object currently appearing in the video. The terminal 20 pulls an advertisement corresponding to the target object from an advertisement system 40, such as an advertisement comprising the target object, so as to increase the click rate and the conversion rate of the advertisement. The following describes the above implementation process in conjunction with the flowchart.

Figure 3:
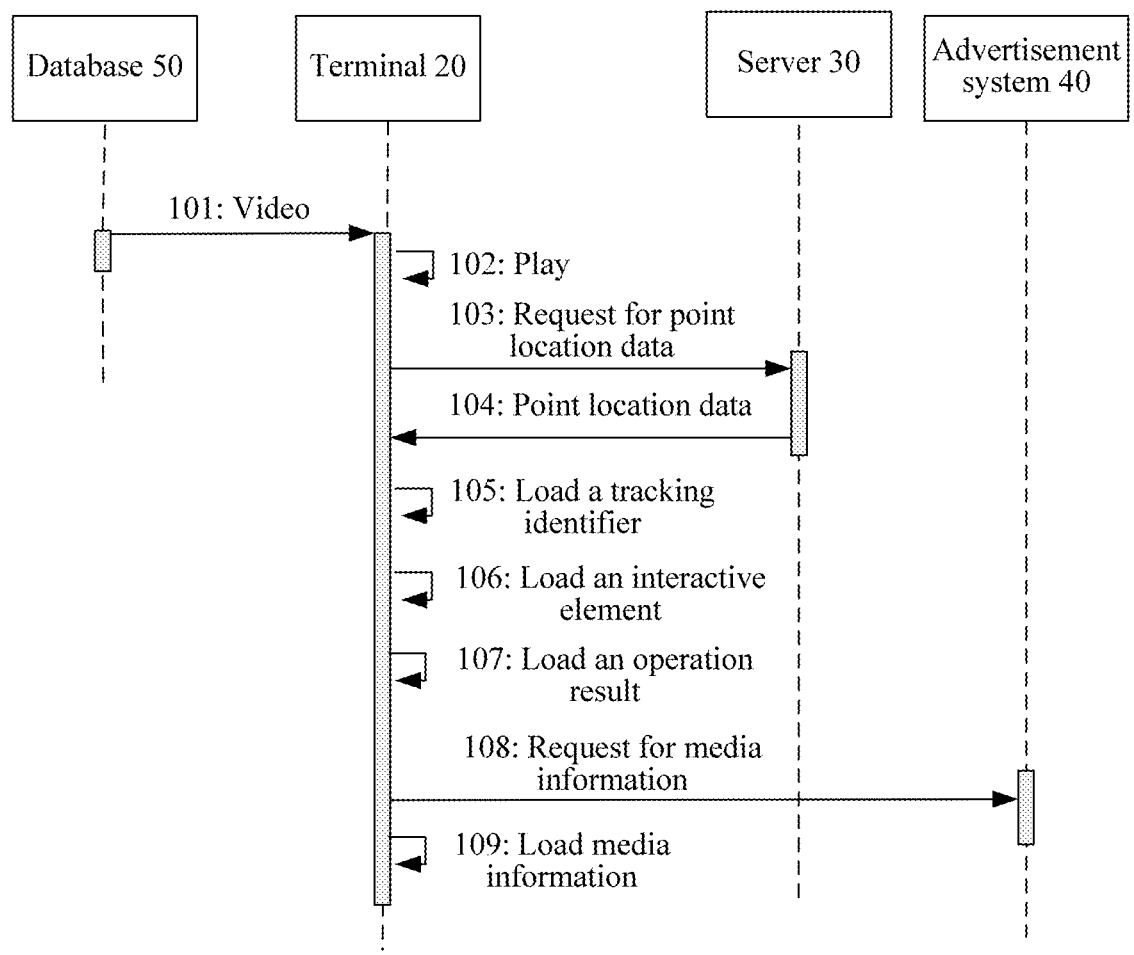
FIG. 3 is an optional flowchart of a media information delivery method in an exemplary embodiment.

An optional flowchart of a media information delivery method shown in FIG. 3 is combined for description. As shown in FIG. 3, the method comprises the following operations:

Operation 101: Acquire a video from a database 50 by terminal 20.

In one embodiment, the terminal 20 runs an online video playing application, and requests the server 30 for streaming media video data according to an identifier of an online video selected by a user.

Streaming media refers to continuous time-based media using a streaming technology in the Internet/Intranet, such as an audio, a video or a multimedia file. The terminal 20 does not download all video data from the server 30 before playing the streaming media, and only stores part of the streaming media video data in a memory for playing. Data streams of the streaming media are played while being transmitted between the terminal 20 and the server 30, but there is a delay due to the influence of the transmission bandwidth only at the beginning of playing.

In one embodiment, the video data of the streaming media is transmitted between the terminal 20 and the server 30 in a manner of realtime streaming or progressive streaming. Generally speaking, if a video needs to be played in real time, it is transmitted by using a streaming media server 30 or adopting, for example, a real time streaming protocol (RTSP). If a hypertext transfer protocol (HTTP) server 30 is used, the video data of the streaming media is sent via a sequential stream. A transmission mode to be adopted is determined based on considerations for real-time video playing. Of course, the terminal 20 may also download all data of a video file locally and then play the data.

Operation 102: Load a playing interface and play a video on the playing interface by the terminal 20.

Operation 103: Request the server 30 for point location data of the video by the terminal 20.

Operation 104: Issue point location data corresponding to a video point location currently played by the terminal 20 to the terminal 20 by the server 30.

In one embodiment, the server 30 provides a query service about point location data for the terminal 20, and the terminal 20 queries whether there is point location data corresponding to a current video point location by using the query service. Illustratively, point location data corresponding to a video point location may comprise the following information:

1) an interactive element bound with a target object (a target character, a target article, etc.) in each frame image of a video point location;

2) location of the target object in each image such as location of a specific part (head or the like) of the target character in each frame image; and 3) an interactive form of the interactive element.

The following operation 105 and operation 106 are processing procedures when the terminal 20 receives the point location data corresponding to the current video point location and plays the current video point location. They may be executed in any order, namely in sequence or in parallel.

Operation 105: When playing the video to a video point location, load a tracking identifier corresponding to a target object included in at least one frame image of the video point location in the playing interface by the terminal 20.

In one embodiment, when a frame image of a target object included in the video point location is loaded in the playing interface, based on the location, in a corresponding frame image in the video point location, of a specific part of the target object indicated by point location data, a layer for floating display at the specific part of the target object is loaded in the corresponding frame image.

For example, when each frame image of the current video point location comprises a character 1, a character 2, and a character 3, based on the location, in each frame image in the video point location, of the head of the character 2 (e.g., target character) indicated by point location data, a layer is loaded at a corresponding location of each frame image. Illustratively, the layer may use various display elements different from a display effect of a frame image, such as a box, a circle, or a virtual item (a hat, etc.), thereby forming an effect of tracking display on a target object in each image frame of a video point location, and prompting a user that an interactive element loaded in operation 106 corresponds to the display-tracked target object.

Operation 106: Load an interactive element corresponding to the target object included in the video point location in the playing interface by the terminal 20.

In one embodiment, the terminal 20 uses an interactive element included in the point location data, or a manner of acquiring the interactive element indicated in the point location data to acquire the interactive element from a corresponding database, and determines that a frame image comprising the target object in the video point location is loaded in a first region of the playing interface according to the location, appearing in each frame image of the video point location, of the target object indicated by the point location data, an interactive element corresponding to the target object is loaded in a second region of the playing interface.

For example, the second region may be overlapped and displayed over the first region with a specific effect (such as a semitransparent effect), so as to draw attention of a user of the terminal 20 to the interactive element and save the space of the playing interface.

For another example, the second region and the first region may be different regions in the playing interface, so that the fact that during the process of playing a video in the first region, the user excessively focuses on the target object in the video point location and the interactive element causes viewing interference to the user is avoided, the first region and the second region may be obtained by dividing the playing interface in any manner, such as a horizontal division, a vertical division, or an irregular division, which is not limited.

In a practical application of an exemplary embodiment, there are such cases where each frame image of the video point location comprises at least two objects, and the display effect of partial objects is not desirable (e.g., a person's face is distorted, the face is too small or too large, etc.). The object in the corresponding video point location of such cases may not be used as a target object, so as to avoid the problem that participation in an interaction may be hindered because the user cannot identify the object.

To achieve the foregoing objective, in one embodiment, the server 30 screens out objects not suitable for binding interactive elements in the video point location to obtain the target object, and indicates the terminal 20 through the corresponding point location data. The terminal 20 determines the target object from at least two objects included in the frame image of the video point location based on the location, in each frame image of the video point location, of the target object indicated by the point location data, that is, screens out partial objects from the at least two objects (not as a target object). It should be pointed out that the screening here does not erase an image of a non-target object from the video point location, but is used for calibrating the identification of a target user.

For example, when each frame image of the video point location comprises a character 1, a character 2, and a character 3, if the location of a target character indicated by point location data corresponds to the character 1, the character 2 and the character 3 are screened out from a current video point location, and the character 1 serves as a calibration to identify a target user.

Illustratively, there are the following cases for the objects that are screened out from each frame image of the video point location:

1) an object located at an edge region of a frame image in the video point location, where for example, an object in the video point location appears in multiple successive frames, but the face cannot be known because the object is always located at the edge of a frame image, and the user may rarely participate in an interaction even if such object is bound with an interactive element;

2) an object whose appearing period in the video point location being less than a time threshold, where for example, if an object appears in only one frame or more discrete frames in a video point location comprising 100 frames, this object may be inappropriate as a target object for binding an interactive element; and 3) an object having definition, smaller than a definition threshold, in the video point location, where for example, in a frame image comprising at least two objects, if a ratio of an object's face to a frame image exceeds a maximum value or is less than a minimum value, the object is often distorted, or not clear enough, and the object is also inappropriate as a target object for binding an interactive element.

Operation 107 and operation 108 are corresponding processes when the terminal 20 receives user participation in interaction, and may be executed in any order or in parallel.

Operation 107: Load, in response to an operation regarding the interactive element, a result responding to the operation in the playing interface by the terminal 20.

In one embodiment, the terminal 20 controls a response of an interactive element to a user operation based on an interactive form in the point location data, and achieves audiovisual effects that are different before and after the response. Illustratively, the operation of the interactive element may be free of charge or for a fee, or, the use rights (such as the type and number of available interactive elements) of the interactive element are allocated correspondingly according to identity information such as user's rating and points by the terminal 20.

For example, when the interactive element is a virtual item such as a flower, once the user triggers a presenting operation to the virtual item, the server 30 synchronizes the number of flowers owned by a target correspondingly in all terminals 20 playing the video, thereby achieving an effect of interaction between users of different terminals 20.

Operation 108: Request an advertisement system for media information corresponding to the target object by the terminal 20.

Take the advertisement as media information as an example, when the target object is a character in a video point location, an advertisement corresponding to the character may be an advertisement for which a target character participates in production, and when the target object is a commodity (e.g., clothes and beverages) in the video point location, the corresponding advertisement may be an advertiser's advertisement for the need of the commodity.

Take the news as media information as an example, when the target object is a character in a video point location, an advertisement corresponding to the character may be the latest news about the character.

Operation 109: Load the media information corresponding to the target object in the playing interface by the terminal 20.

As before, once the user of the terminal 20 participates in an interaction regarding the target object, it represents the user's attention to the target object. At this time, if an advertisement associated with the target object is delivered to the user, the requirements of the user for understanding the target object may be met, and the user more probably clicks on the advertisement, thereby increasing the click rate and conversion rate of the delivered target object.

In one embodiment, when detecting that the user of the terminal 20 participates in the interaction of the target object, the terminal 20 requests an advertisement system for an advertisement associated with a target object indicated by the point location data, and an advertisement corresponding to the target object is loaded in the playing interface when playing the video point location comprising the target object in the playing interface. Once the user clicks on the advertisement, or after the advertisement is clicked, acts to generate an advertisement effect (such as registering on an advertisement adjustment page, placing an order, and leaving contact information) may be performed, and it is explained that information about the delivered advertisement precisely matches with an interest of the user of the terminal 20, so that the effect of accurately delivering an advertisement to the user of the terminal 20 can be achieved.

The foregoing describes an example in which the user of the terminal 20 implements an operation on the interactive element of the target object so as to trigger the delivery of media information to the user of the terminal 20. As an alternative manner of delivering an advertisement to the user of the terminal 20, an advertisement may also be delivered based on user's trigger of the tracking identifier of the target object.

Figure 4:
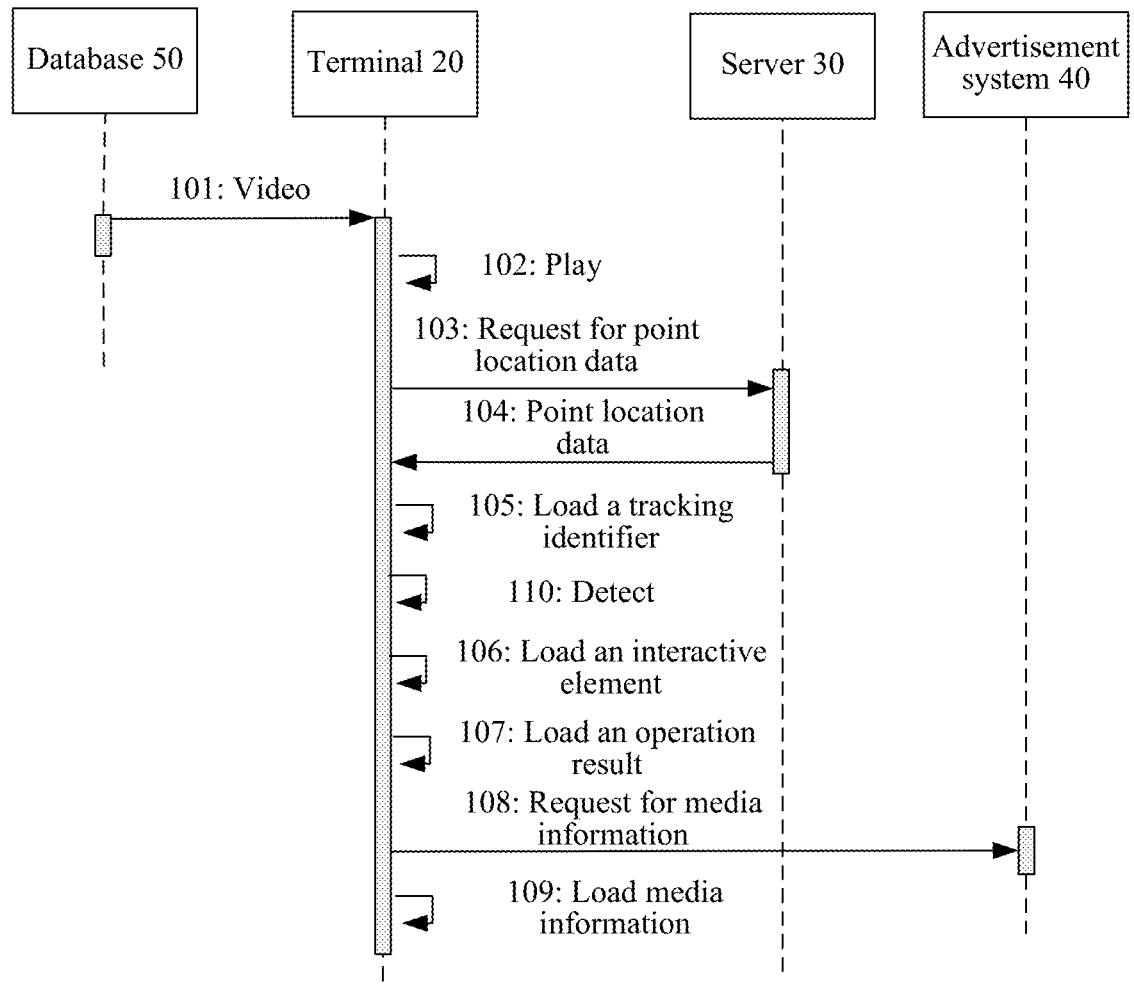
FIG. 4 is another optional flowchart of media information delivery in an exemplary embodiment.

In operation 105 and operation 106, an interactive element corresponding to the target object is also loaded in the playing interface while the tracking identifier of the target object is loaded in the playing interface. As an alternative to operation 105 and operation 106, with reference to another optional flowchart of media information delivery shown in FIG. 4, after loading the tracking identifier of the target object in the playing interface (operation 105), it is also detected whether a triggering operation of the user for a tracking identifier of a target user is received (operation 110). If so, the terminal 20 loads the interactive element of the target object included in the corresponding video point location in the playing interface (operation 106). If not, the detection continues until the triggering operation of the user for the tracking identifier of the target user is detected, or until the play of the video point location is ended, that is, a frame image comprising the target object is no longer loaded in the playing interface.

The advantage of loading the interactive element after detecting the triggering operation of the user for the tracking identifier is to avoid causing interference to the user for watching the video. When the user needs to participate in the interaction, the interactive element may be triggered to be loaded through the tracking identifier. That is, not only a target object of a current video point location is prompted by the tracking identifier, but also the function of controlling whether to participate in the interaction of the target object is also achieved, and the flexibility is higher.

As described above, the server 30 provides the terminal 20 with a query service about point location data of different video point locations in a video, and the server 30 may pre-form corresponding point location data for an existing recorded video, or may also form point location data for an online live video in real time. The implementation process of forming point location data and sending it to the terminal 20 will be described below in conjunction with the flowchart.

Illustratively, the server 30 may pre-generate point location data before the terminal 20 requests for the point location data of a video, or generate the point location data in real time when the terminal 20 queries the point location data. The scenario in which the server 30 pre-generates point location data will be described.

Figure 5:
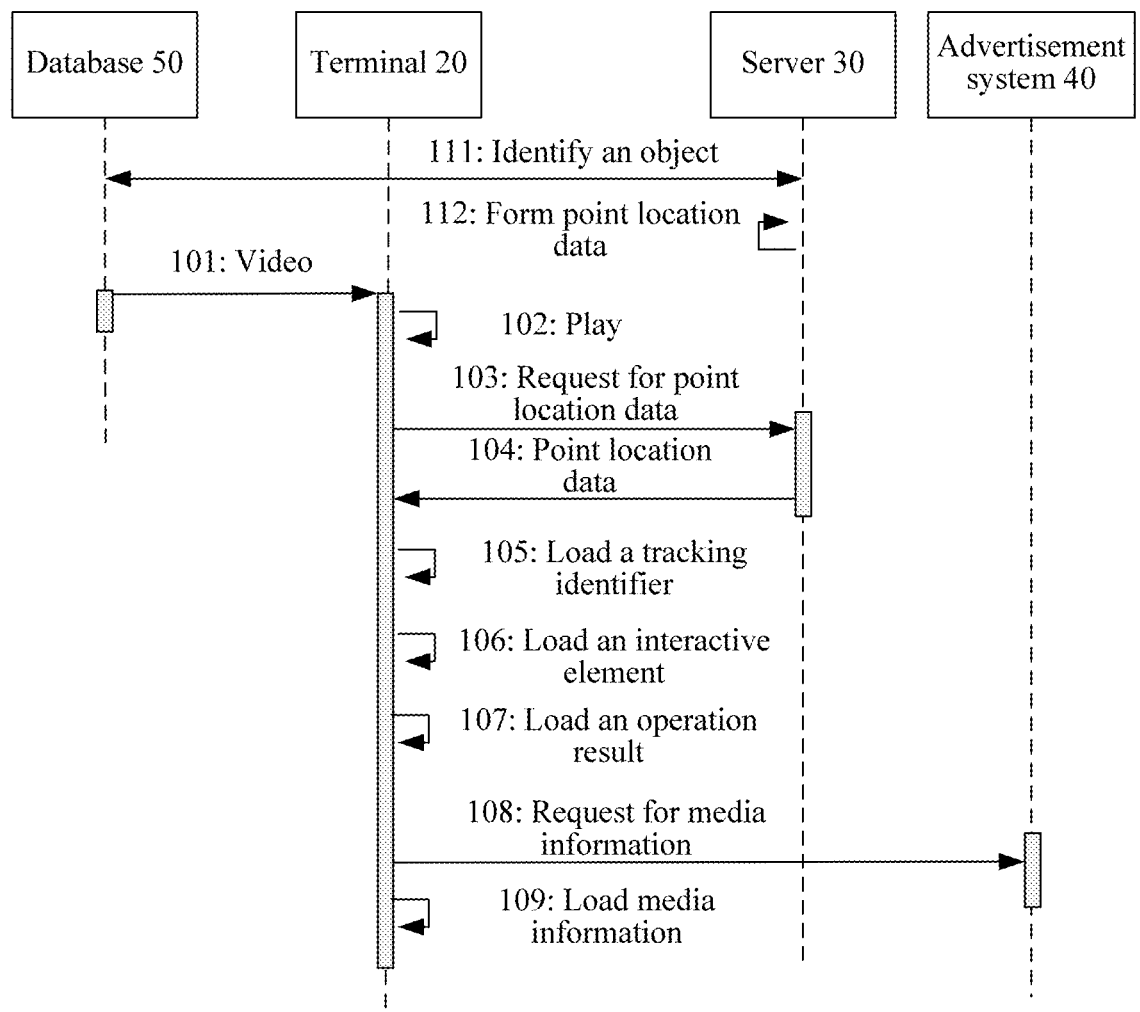
FIG. 5 is another optional flowchart of a media information delivery method in an exemplary embodiment.

With reference to another optional flowchart of a media information delivery method shown in FIG. 5, the method comprises the following operations:

Operation 111: Identify a target object of each frame image in a video by a server 30.

Figure 12:
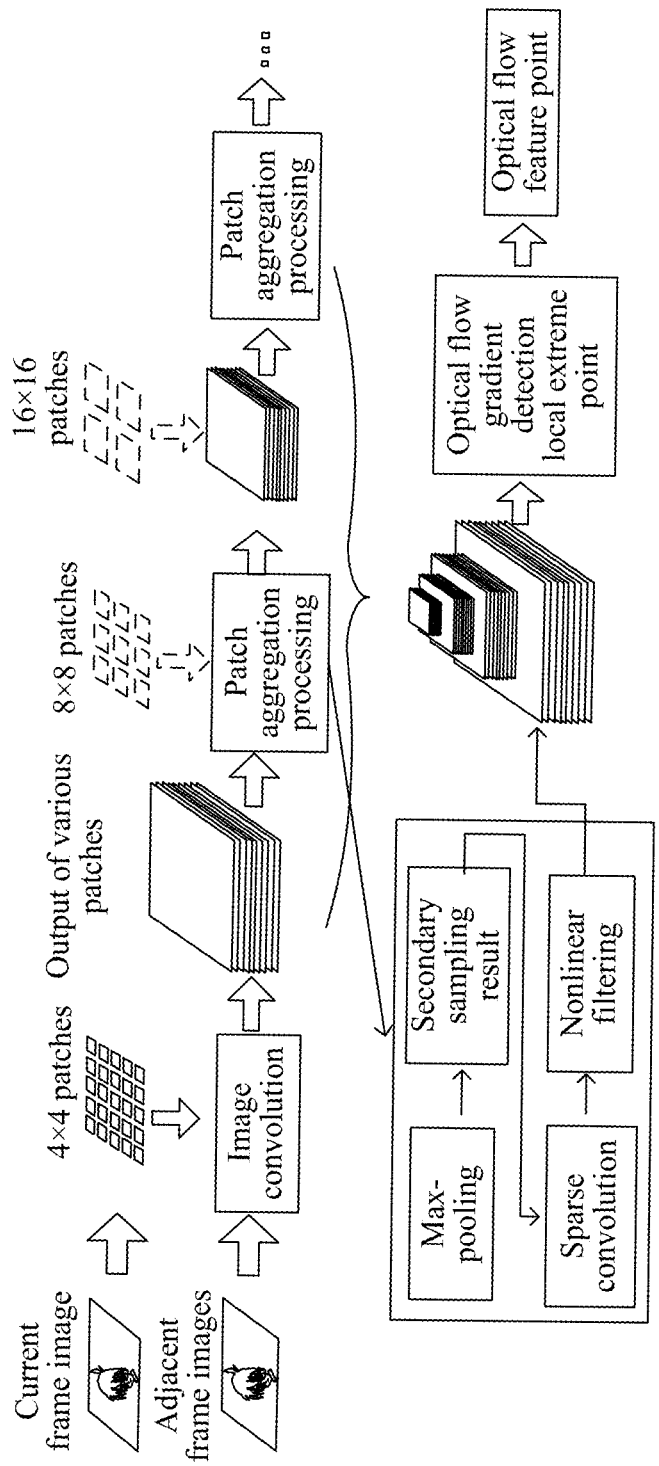
FIG. 12 is an optional flowchart of tracking a face in a video in an exemplary embodiment.

In one embodiment as shown in FIG. 12, the server 30 decodes the video to obtain each frame image, and performs object detection on the frame image to obtain a region comprising the object; the server performs deep convolutional feature matching on two frame images adjacent in a time domain, so as to obtain optical flow feature points of the object; and the server determines whether to perform tracking identification on the object in each frame image according to the stability and number of the optical flow feature points of the object.

The above-mentioned object identification mode has a relatively small limitation on the motion amplitude of an object between frame images, and may identify a large inter-frame displacement of the object between the frame images, and maintain the rotation-invariant characteristics of the object between the frame images. That is to say, even if the object rotates between the frame images, it can be accurately identified, and the sensitivity to noise is reduced.

In one embodiment, the server 30 screens out partial objects from at least two objects included in the video to obtain the target object, the partial objects comprising at least one of the following types of objects:

1) an object located at an edge region of a frame image in the video point location;

2) an object whose appearing period in the video point location being less than a time threshold; and 3) an object having definition, smaller than a definition threshold, in the video point location.

Take a character as an object as an example again, some characters screened out from the video by the server 30 may be:

1) a character whose face area ratio is less than a minimum value or greater than a maximum value, where the character may be distorted when the face area ratio is less than the minimum value or greater than the maximum value, it is difficult to attract the user, and thus it is not suitable for binding an interactive element;

2) a character whose face is located at an edge region of a frame image in the video, where the face cannot be known by the user of the terminal 20 because the face is always located at the edge of the frame image, and the user will rarely participate in an interaction even if such object is bound with an interactive element; and 3) a character who does not have a front face in the frame image.

Operation 112: Form point location data corresponding to different video point locations in the video based on the identified target object and an interactive element of the target object by the server 30.

As before, illustratively, the server 30 forms point location data based on the following information:

1) an interactive element bound with a target object (a target character, a target article, etc.) in each frame image of a video point location, or a mode of acquiring the bound interactive element, such as a storage address of the interactive element in a database;

2) location of the target object in each image such as location of a specific part (head or the like) of the target character in each frame image; and 3) an interactive form of the interactive element.

In conjunction with such an example, it is explained that the face of a target character is tracked in a video, an interactive element is loaded in a playing interface of the video, and an advertisement corresponding to the target character is delivered to a terminal user when receiving the user's operation on the interactive element.

Figure 6:
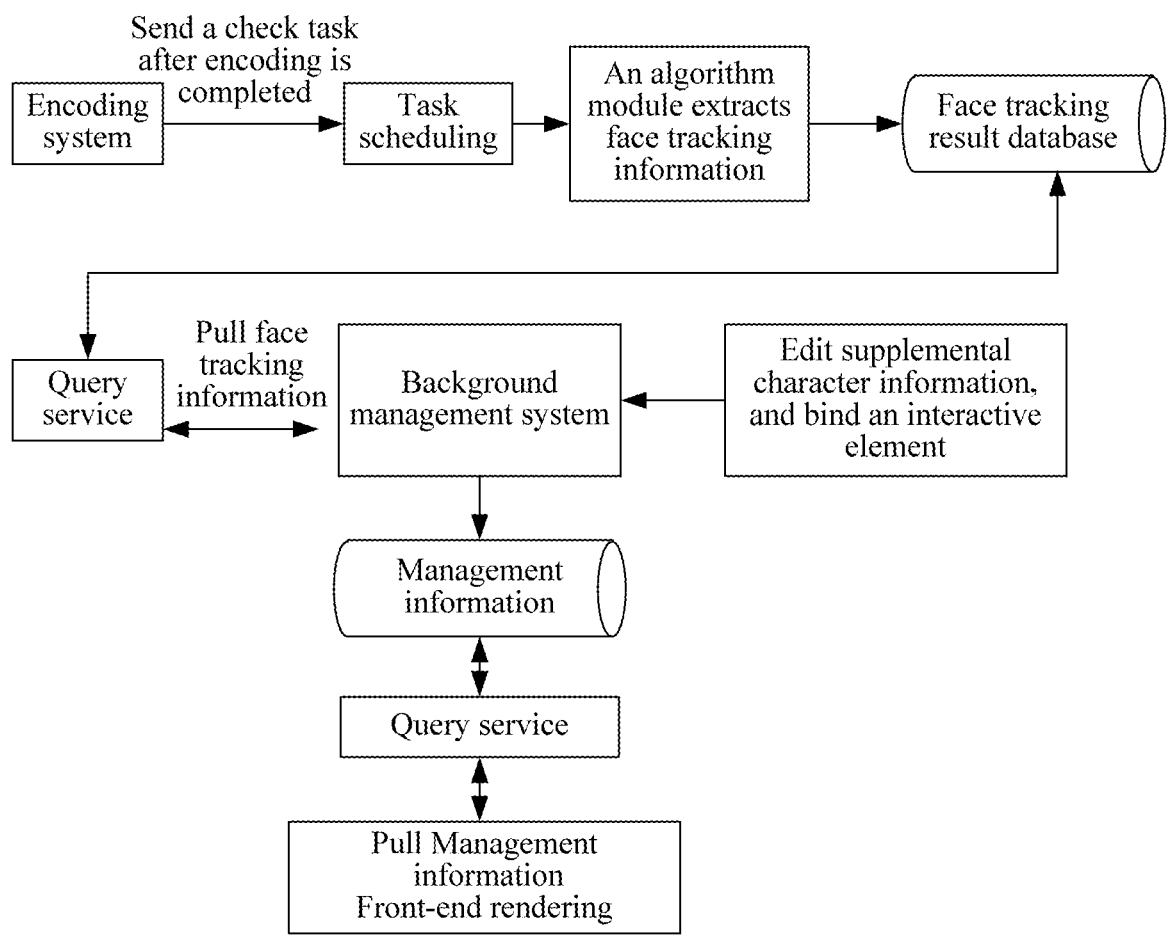
FIG. 6 is an optional schematic system architecture diagram of a video interactive advertisement in an exemplary embodiment.

Referring to an optional schematic system architecture diagram of a video interactive advertisement shown in FIG. 6, an encoding system of the server 30 encodes to form a video, and an algorithm module extracts face tracking information (that is, location of a face in each frame image of the video) from the video through task scheduling, and stores the face tracking information in a library.

A background management system acquires the face tracking information from a database in a form of query service, determines which faces in the video need to be bound with interactive information, and binds character information and interactive elements corresponding to a target face to form point location data management information.

The terminal 20 queries the background management system for point location data corresponding to a current progress when playing the video. The terminal 20 displays a layer that tracks the face and an interactive element of the corresponding character. When an operation regarding the interactive element is received, an advertisement in which a character pulled from an advertisement system participates is played at the terminal 20.

An optional schematic diagram of a playing interface of a terminal 20 is shown in FIG. 7 to FIG. 11.

Figure 7:
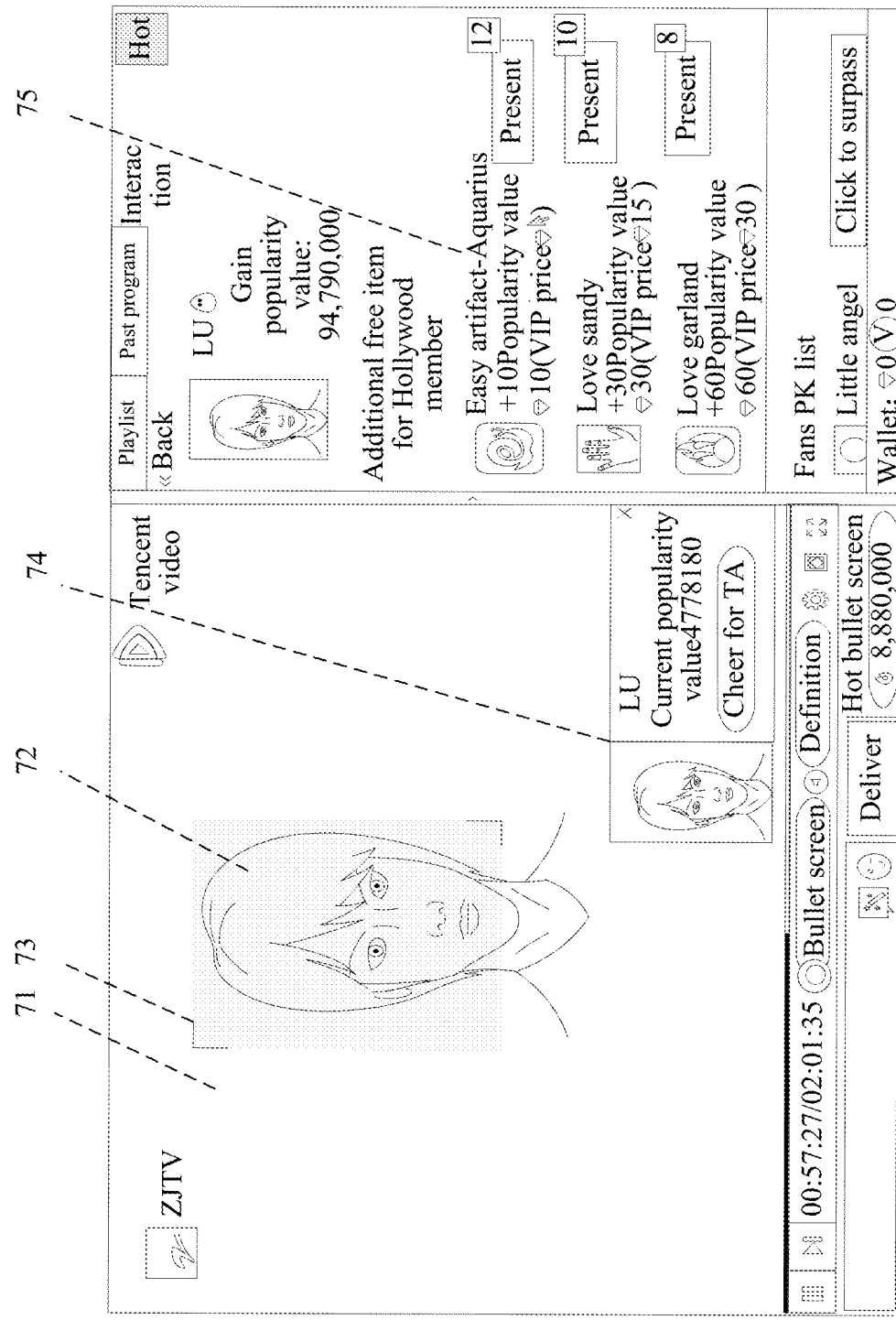
FIG. 7 to FIG. 11 are an optional schematic diagram of a playing interface of a terminal in an exemplary embodiment.

In FIG. 7, a region 71 of the play interface is used to play a video. When the video is played to a face interaction point location, a floating layer 73 tracking a face 72 will be automatically popped. Character information 74 about a star appears at a lower right corner of the region 71 of the playing interface, and a user may perform an interactive operation in a region 75, such as thumbing up for a favorite star and sending flowers.

Figure 8:
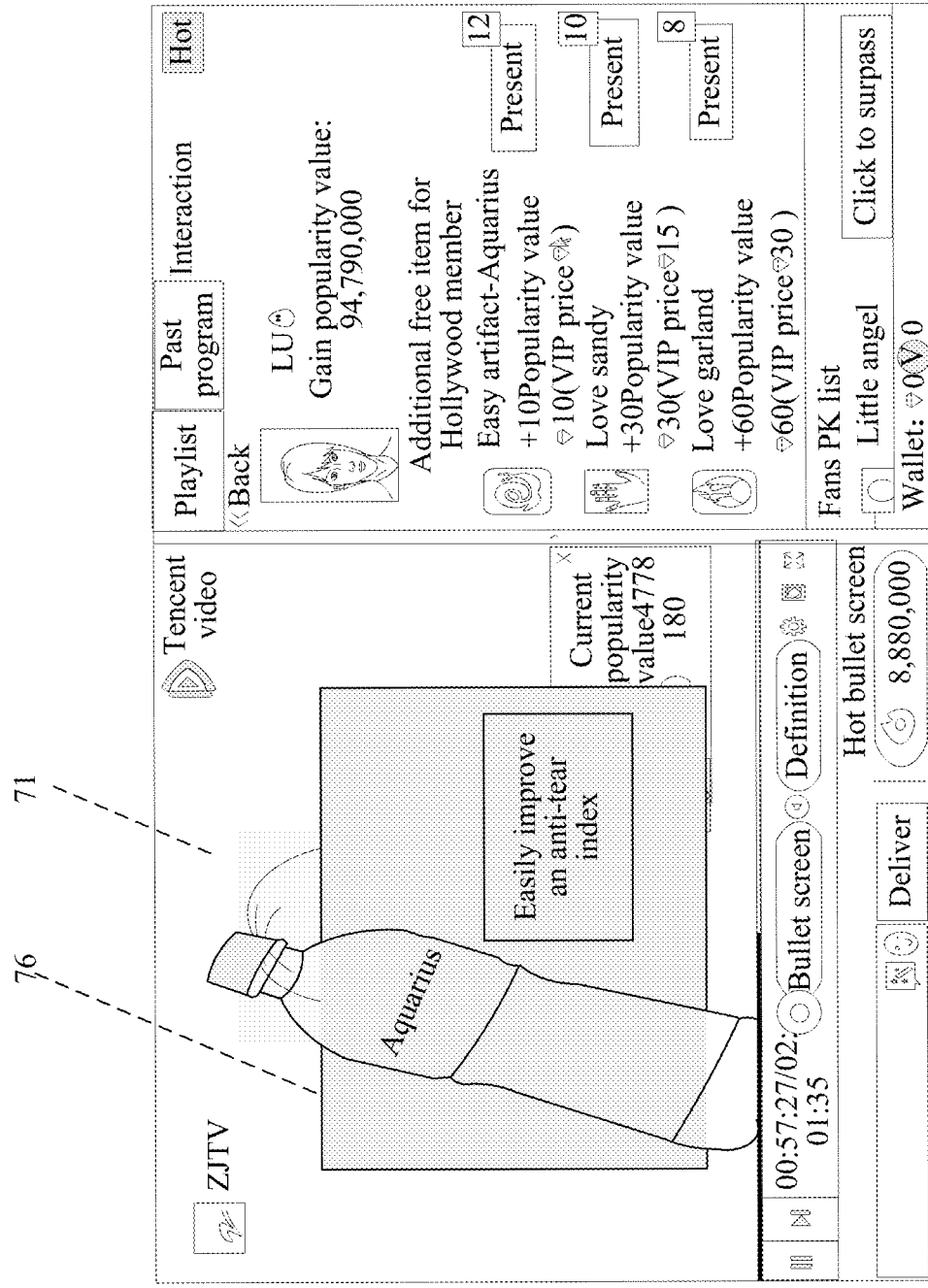

In FIG. 8, the user of the terminal 20 presents a virtual item in the region 71 and then loads, in the region 71 of the playing interface, an advertisement 76 in which a corresponding character participates.

Figure 9:
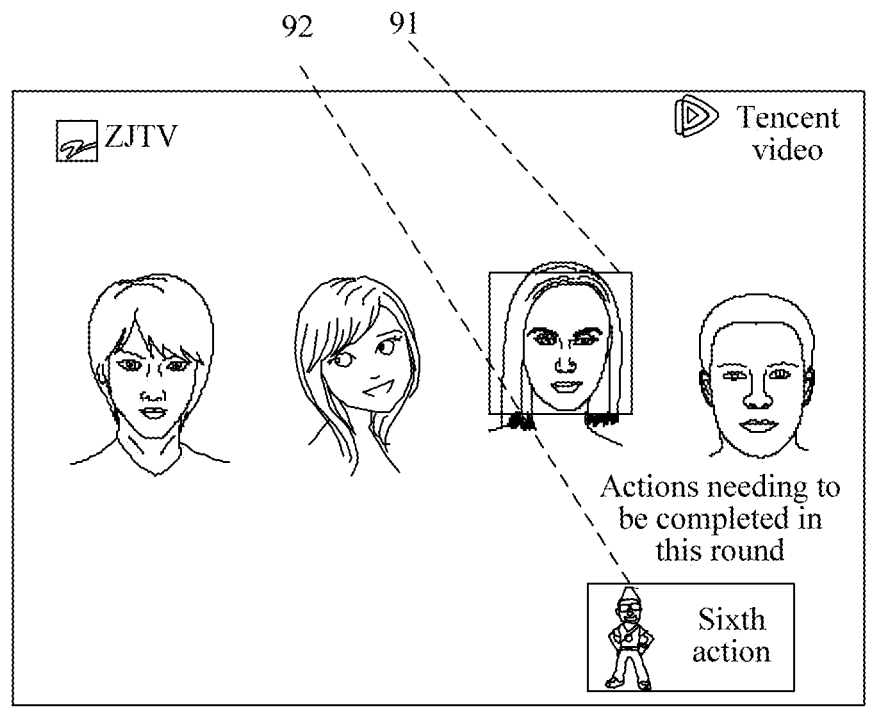

In FIG. 9, a video frame comprises a plurality of faces. A target face screened based on the foregoing screening mode is identified by a box 91, and performs floating display on related information 92 of a character corresponding to the target face.

Figure 10:
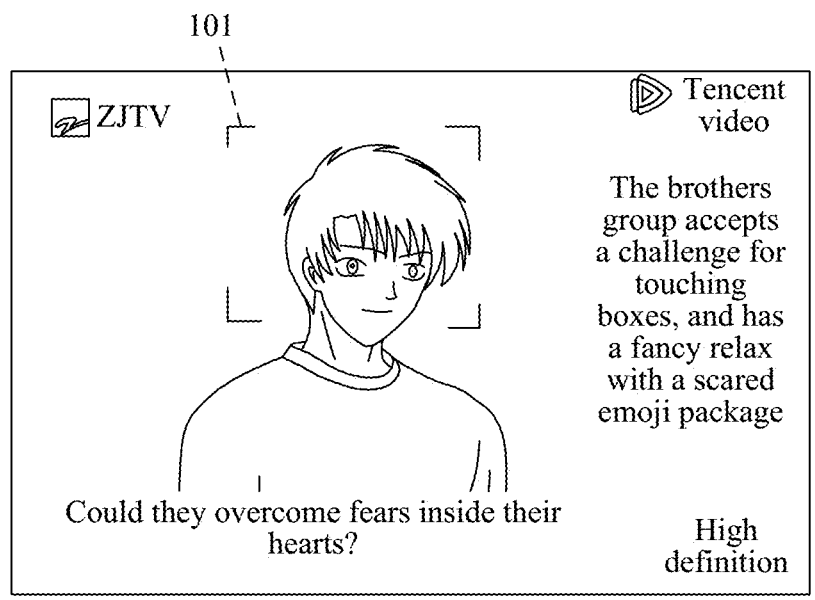

In FIG. 10, only one face is identified as a target face by the block 101. Specifically, when receiving a clicking operation for the block 101, the terminal 20 will load an interactive interface for the corresponding character in the playing interface to avoid disturbance during video watching.

Figure 11:
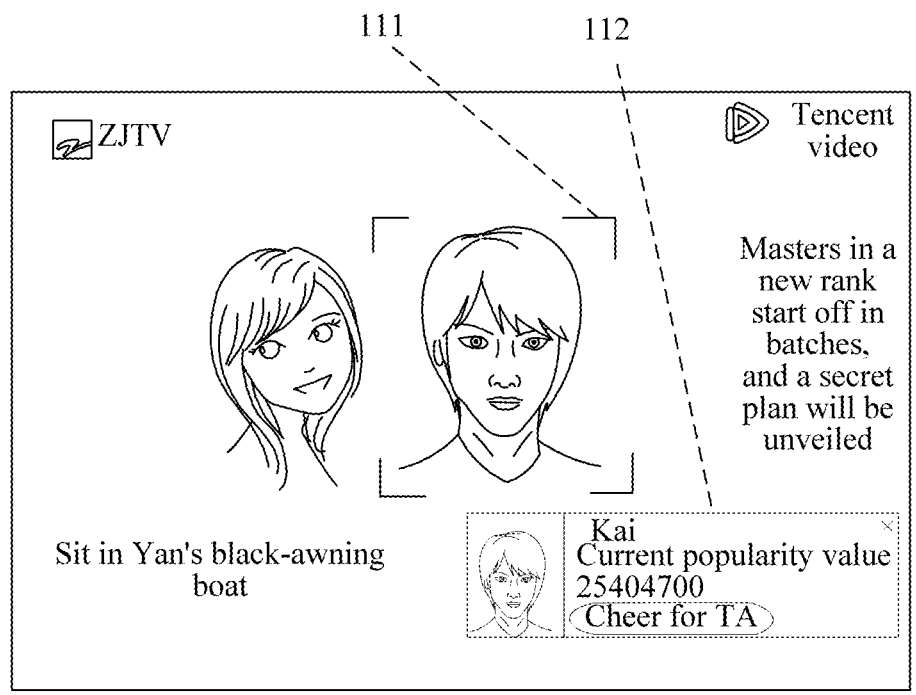

In FIG. 11, a target face is identified by a box 111, and information 112 about a corresponding character is loaded in a playing interface.

FIG. 12 is an optional flowchart of tracking a face in a video.

Based on the above example, it can be seen that:

1) on a user side, a user may participate in an interaction while watching a video, a unilateral, monotonous video information receiving mode is eliminated, and viewer may express the watching experience in real time by, for example, sending flowers; and 2) in terms of media information delivery, advertising is taken as an example, where a personalized delivery form of a target object (such as automobiles, star bags and clothes) is analyzed based on a video content, the delivery type of advertisements can be enriched, and compared with a manner of forcibly watching a video advertisement in a form of delivering an advertisement to a title, an end or an interval, the user experience is more friendly.

When a user presents a virtual item (such as thumbing up, cheering or flower sending) to a favorite target object, some advertisements associated with the target object are pushed. This manner makes the user actively acquire an advertisement, truly achieves advertising based on user's interests, and greatly increases the click rate and conversion rate of the advertisement.

Figure 13:
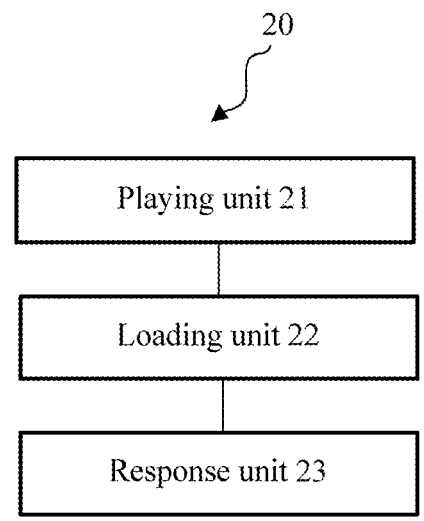
FIG. 13 is an optional schematic function structure diagram of a terminal in an exemplary embodiment.

A logic function structure of the foregoing terminal 20 is described with reference to an optional schematic logic function structure diagram of a terminal 20 shown in FIG. 13. The terminal comprises:

a playing unit 21, configured to load a playing interface and play a video on the playing interface;

a loading unit 22, configured to load, when the playing unit 21 plays the video to a video point location, a tracking identifier corresponding to a target object included in the video point location in the playing interface, and load an interactive element corresponding to the target object included in the video point location in the playing interface; and a response unit 23, configured to load, in response to an operation regarding the interactive element, a result responding to the operation in the playing interface, and load media information corresponding to the target object in the playing interface.

In one embodiment, the loading unit 22 is further configured to load, when a frame image of a target object included in the video point location is loaded in the playing interface, a layer for floating display at a specific part of the target object in a corresponding frame image based on the location of the specific part of the target object in the corresponding frame image in the video point location.

In one embodiment, the loading unit 22 is further configured to load, when a frame image comprising the target object is loaded in a first region of the playing interface, an interactive element corresponding to the target object in a second region of the playing interface.

In one embodiment, the loading unit 22 is further configured to load an interactive element corresponding to the target object included in the video point location in the playing interface when detecting an operation regarding the tracking identifier.

In one embodiment, the loading unit 22 is further configured to screen out, when a frame image of the video point location comprises at least two objects, partial objects from the at least two objects to obtain the target object, and load, when a frame image corresponding to the target object is loaded in the playing interface, a layer for tracking display at the specific part of the target object at a corresponding location based on the location of the specific part of the target object in each frame image in the video point location.

In one embodiment, the loading unit 22 is further configured to screen out, in the playing interface, at least one of the following types of objects:

an object located at an edge region of a frame image in the video point location;

an object whose appearing period in the video point location being less than a time threshold; and an object having definition, smaller than a definition threshold, in the video point location.

Figure 14:
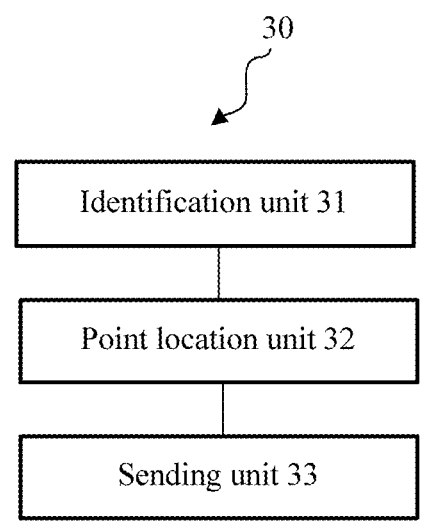
FIG. 14 is an optional schematic function structure diagram of a server in an exemplary embodiment.

A logic function structure of the foregoing server 30 is described with reference to an optional schematic logic function structure diagram of a server 30 shown in FIG. 14. The server comprises:

an identification unit 31, configured to analyze a target object of each frame image in a video;

a point location unit 32, configured to form point location data corresponding to different video point locations in the video based on the identified target object and an interactive element of the target object; and a sending unit 33, configured to send the point location data of the corresponding video point locations to a terminal 20, the point location data being used for allowing the terminal 20 to load a tracking identifier corresponding to a target object included in the video point location in a playing interface, and to load an interactive element corresponding to the target object included in the video point location in the playing interface.

In one embodiment, the identification unit 31 is further configured to: decode the video to obtain each frame image, and perform object detection on the frame image to obtain a region comprising the object;

perform deep convolutional feature matching on two frame images adjacent in a time domain, so as to obtain optical flow feature points of the object; and determine whether to perform tracking identification on the object in each frame image according to the stability and number of the optical flow feature points of the object.

In one embodiment, the identification unit 31 is further configured to screen out partial objects from at least two objects included in the video to obtain the target object, the partial objects comprising at least one of the following objects:

an object located at an edge region of a frame image in the video point location;

an object whose appearing period in the video point location being less than a time threshold; and an object having definition, smaller than a definition threshold, in the video point location.

Functions of a terminal 20 and a server 30 in the media information delivery system shown in FIG. 2 are described.

The terminal 20 is configured to: load a playing interface and play the video on the playing interface;

load, when the video is played to a video point location, a tracking identifier corresponding to a target object included in the video point location in the playing interface, and load an interactive element corresponding to the target object included in the video point location in the playing interface; and load, in response to an operation regarding the interactive element, a result responding to the operation in the playing interface, and load media information corresponding to the target object in the playing interface.

In one embodiment, the terminal 20 is further configured to load, when a frame image of a target object included in the video point location is loaded in the playing interface, a layer for floating display at a specific part of the target object in a corresponding frame image based on the location, in the corresponding frame image in the video point location, of the specific part of the target object.

In one embodiment, the terminal 20 is further configured to load, when a frame image comprising the target object in the video point location is loaded in a first region of the playing interface, an interactive element corresponding to the target object in a second region of the playing interface.

In one embodiment, the terminal 20 is further configured to load an interactive element corresponding to the target object included in the video point location in the playing interface when detecting an operation regarding the tracking identifier.

In one embodiment, the terminal 20 is further configured to screen out, when a frame image of the video point location comprises at least two objects, partial objects from the at least two objects to obtain the target object, and load, when a frame image corresponding to the target object is loaded in the playing interface, a layer for tracking display at a specific part of the target object at a corresponding location based on the location of the specific part of the target object in each frame image in the video point location.

The server 30 is configured to: analyze a target object of each frame image in a video;

form point location data corresponding to different video point locations in the video based on the identified target object and an interactive element of the target object; and send the point location data of the corresponding video point locations to the terminal 20, the point location data being used for allowing the terminal 20 to load a tracking identifier corresponding to a target object included in the video point location in a playing interface, and to load an interactive element corresponding to the target object included in the video point location in the playing interface.

In one embodiment, the server 30 is further configured to: decode the video to obtain each frame image, and perform object detection on the frame image to obtain a region comprising the object;

perform deep convolutional feature matching on two frame images adjacent in a time domain, so as to obtain optical flow feature points of the object; and determine whether to perform tracking identification on the object in each frame image according to the stability and number of the optical flow feature points of the object.

In one embodiment, the server 30 is further configured to screen out partial objects from at least two objects included in the video to obtain the target object, the partial objects comprising at least one of the following types of objects:

an object located at an edge region of a frame image in the video point location;

an object whose appearing period in the video point location being less than a time threshold; and an object having definition, smaller than a definition threshold, in the video point location.

To sum up, the embodiment of the present invention has the beneficial effects as follows.

1) A video content is analyzed by object detection such as face detection and a face tracking technology, and multiple conditions are provided to screen a better object such as a star's face.

2) An interactive video technology makes a user actively acquire media information (such as an advertisement), truly achieves advertising based on user's interests, and greatly increases the click rate and conversion rate of the advertisement.

3) Based on a face detection tracking algorithm, the effect of user video interactive experience is improved, and the loss of face tracking is avoided.

The embodiment also provides a storage medium (such as the memory 12 in FIG. 1), storing an executable program. When being executed by a processor, the executable program is used to implement an image processing method provided by the embodiment, such as an image processing method as shown in any of the drawings namely FIG. 3, FIG. 4, and FIG. 5, the storage medium comprising a volatile random access memory (RAM), a read only memory (ROM), an electrically erasable programmable read-only memory (EEPROM), a flash memory or other memory technologies, a compact disc read-only memory (CD-ROM), a digital versatile disk (DVD) or other accessed media.

At least one of the components, elements, modules or units represented by a block as illustrated in the drawings may be embodied as various numbers of hardware, software and/or firmware structures that execute respective functions described above, according to an embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or be implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the embodiments may be implemented in algorithms that execute on one or more processors. Furthermore, the components, elements or units represented by a block or processing steps may employ any number of related art techniques for electronics configuration, signal processing and/or control, data processing and the like.

The above descriptions are merely specific implementation manners of the disclosure. However, the protection scope of the disclosure is not limited to this. Variations or replacements easily conceivable, within the disclosed technical scope of the disclosure, to any person skilled in the art should fall within the protection scope of the disclosure. Therefore, the protection scope of the disclosure should be subject to the protection scope of the claims.

The media information delivery method according to the exemplary embodiment comprises: loading a playing interface and playing a video on the playing interface; loading, when the video is played to a video point location, a tracking identifier corresponding to a target object included in the video point location in the playing interface, and loading an interactive element corresponding to the target object included in the video point location in the playing interface; and loading, in response to an operation regarding the interactive element, a result responding to the operation in the playing interface, and loading media information corresponding to the target object in the playing interface. Thus, the exemplary embodiment associates delivery of media information with participation of a user in an interaction with a target object in a video. When the user participates in the interaction, media information such as an advertisement corresponding to the target object is delivered to the user, thereby avoiding the blindness of delivering media information in a video playing process in the related technology, and ensuring that the delivered media information meets current requirements of the user.

What is claimed is:

1. A media information delivery method, comprising:

providing, by a terminal, a playing interface and playing a video on the playing interface;

in response to the video being played to a video point location, tracking, by the terminal, display of a target object included in at least one frame image of the video point location by using a tracking identifier corresponding to the target object in the playing interface, and providing an interactive element corresponding to the target object on the playing interface; and providing, by the terminal, in response to an operation regarding the interactive element, a result responding to the operation in the playing interface, and providing media information corresponding to the target object on the playing interface, wherein the tracking comprises screening out, when a frame image of the video point location comprises a plurality of objects, at least one object that satisfies any of the following:

an object located at an edge region of the frame image of the video point location;

an object whose appearing period in the frame image of the video point location being less than a time threshold; and an object having definition, smaller than a threshold, in the frame image of the video point location, and wherein the target object is determined from among the plurality of objects that is not screened out.

2. The method according to claim 1, wherein the tracking comprises:

in response to a frame image of the target object being on the playing interface, providing a layer for floating display at the target object in a corresponding frame image based on a location of the target object in the corresponding frame image in the video point location.

3. The method according to claim 1, wherein the providing the interactive element comprises:
in response to a frame image comprising the target object being on a first region of the playing interface, providing the interactive element corresponding to the target object on a second region of the playing interface.

4. The method according to claim 1, wherein the providing the interactive element comprises:
providing the interactive element on the playing interface when detecting an operation regarding the tracking identifier.

5. The method according to claim 1, wherein the tracking comprises:
when a frame image corresponding to the target object is provided on the playing interface, providing a layer for tracking the display of the target object at a corresponding location based on a location of the target object in each frame image in the video point location.

6. A media information delivery method, comprising:
identifying, by a server, a target object of each frame image in a video;
forming, by the server, point location data corresponding to different video point locations in the video based on the identified target object and an interactive element of the target object; and
sending, by the server, the point location data to a terminal,
the point location data being used for allowing the terminal to track display of the target object included in the video point location in a playing interface by using a tracking identifier corresponding to the target object in the playing interface, and to provide the interactive element corresponding to the target object on the playing interface,
wherein the identifying comprises screening out, when a frame image of the video point location comprises a plurality of objects, at least one object that satisfies any of the following:
an object located at an edge region of a frame image of the video point location;
an object whose appearing period in the frame image of the video point location being less than a time threshold; and
an object having definition, smaller than a threshold, in the frame image of the video point location, and
wherein the target object is determined from among the plurality of objects that is not screened out.

7. The method according to claim 6, wherein the identifying comprises:
decoding the video to obtain each frame image, and performing object detection on each frame image to obtain a region comprising an object;
performing deep convolutional feature matching on two frame images adjacent in a time domain, so as to obtain optical flow feature points of the object; and
determining whether to perform tracking identification on the object in each frame image according to a stability and a number of the optical flow feature points of the object.

8. A media information delivery method, comprising:
identifying, by a server, a target object of each frame image in a video;
forming, by the server, point location data corresponding to different video point locations in the video based on the identified target object and an interactive element of the target object;
sending, by the server, the point location data to a terminal;
providing a playing interface and playing the video on the playing interface;
in response to the video being played to a video point location, tracking display of the target object included in at least one frame image of the video point location by using a tracking identifier corresponding to the target object in the playing interface, and providing the interactive element corresponding to the target object on the playing interface; and
providing, in response to an operation regarding the interactive element, a result responding to the operation in the playing interface, and providing media information corresponding to the target object on the playing interface,
wherein the identifying the target object comprises:
screening out, when a frame image of the video point location comprises a plurality of objects, at least one object that satisfies any of the following:
an object located at an edge region of the frame image of the video point location;
an object whose appearing period in the frame image of the video point location being less than a time threshold; and
an object having definition, smaller than a threshold, in the frame image of the video point location, and
determining the target object from among the plurality of objects that is not screened out.

9. A terminal, comprising:
at least one memory operable to store program code; and
at least one processor operable to read the program code, and operate as instructed by the program code, said program code including:
playing code configured to cause the at least one processor to provide a playing interface and play a video on the playing interface;
loading code configured to cause the at least one processor to, in response to the video being played to a video point location, track display of a target object included in at least one frame image of the video point location by using a tracking identifier corresponding to the target object in the playing interface, and providing an interactive element corresponding to the target object on the playing interface; and
response code configured to cause the at least one processor to, in response to an operation regarding the interactive element, provide a result responding to the operation in the playing interface, and provide media information corresponding to the target object on the playing interface,
wherein the loading code causes the at least one processor to determine the target object by:
screening out, when a frame image of the video point location comprises a plurality of objects, at least one object that satisfies any of the following:
an object located at an edge region of the frame image of the video point location;
an object whose appearing period in the frame image of the video point location being less than a time threshold; and
an object having definition, smaller than a threshold, in the frame image of the video point location, and
determining the target object from among the plurality of objects that is not screened out.

10. The terminal according to claim 9, wherein
the loading code further causes the at least one processor to, in response to a frame image of the target object included in the video point location being provided the playing interface, provide a layer for floating display at the target object in a corresponding frame image based on a location of the target object in the corresponding frame image in the video point location.

11. The terminal according to claim 9, wherein
the loading code further causes the at least one processor to, in response to a frame image comprising the target object being on a first region of the playing interface, provide the interactive element corresponding to the target object on a second region of the playing interface.

12. The terminal according to claim 9, wherein
the loading code further causes the at least one processor to provide the interactive element corresponding to the target object on the playing interface in response to detecting an operation regarding the tracking identifier.

13. The terminal according to claim 9, wherein
the loading code further causes the at least one processor to provide, a frame image corresponding to the target object being provided on the playing interface, a layer for tracking the display of the target object at a corresponding location based on a location of the target object in each frame image in the video point location.

14. A server, comprising:
at least one memory operable to store program code; and
at least one processor operable to read the program code, and operate as instructed by the program code, said program code including:
  identification code configured to cause the at least one processor to identify a target object of each frame image in a video;
  point location code configured to cause the at least one processor to form point location data corresponding to different video point locations in the video based on the identified target object and an interactive element of the target object; and
  sending code configured to cause the at least one processor to send the point location data to a terminal,
the point location data being used for allowing the terminal to track display of the target object included in the video point location in a playing interface by using a tracking identifier corresponding to the target object in the playing interface, and to provide the interactive element corresponding to the target object on the playing interface,
wherein the identification code further causes the at least one processor to identify the target object by:
screening out, when a frame image of the video point location comprises a plurality of objects, at least one object that satisfies any of the following,
  an object located at an edge region of a frame image in the frame image of the video point location;
  an object whose appearing period in the frame image of the video point location being less than a time threshold; and
  an object having definition, smaller than a threshold, in the frame image of the video point location, and
determining the target object from among the plurality of objects that is not screened out.

15. The server according to claim 14, wherein
the identification code further causes the at least one processor to decode the video to obtain each frame image, and perform object detection on each frame image to obtain a region comprising an object;
perform deep convolutional feature matching on two frame images adjacent in a time domain, so as to obtain optical flow feature points of the object; and
determine whether to perform tracking identification on the object in each frame image according to a stability and a number of the optical flow feature points of the object.

16. A media information delivery system, comprising a server and a terminal,
the server being configured to identify a target object of each frame image in a video,
the server being further configured to form point location data corresponding to different video point locations in the video based on the identified target object and an interactive element of the target object,
the server being further configured to send the point location data to the terminal,
the terminal being configured to:
  provide a playing interface and play the video on the playing interface;
  in response to the video being played to a video point location, track display of the target object included in at least one frame image of the video point location by using a tracking identifier corresponding to the target object in the playing interface, and provide the interactive element corresponding to the target object on the playing interface; and
  in response to an operation regarding the interactive element, provide a result responding to the operation in the playing interface, and provide media information corresponding to the target object on the playing interface,
wherein the terminal is further configured to determine the target object by:
screening out, when a frame image of the video point location comprises a plurality of objects, at least one object that satisfies any of the following,
  an object located at an edge region of a frame image in the frame image of the video point location;
  an object whose appearing period in the frame image of the video point location being less than a time threshold; and
  an object having definition, smaller than a threshold, in the frame image of the video point location, and
determining the target object from among the plurality of objects that is not screened out.

* * * * *